US008009539B2

(12) United States Patent  (10) Patent No.: US 8,009,539 B2
Haustein et al.  (45) Date of Patent: Aug. 30, 2011

(54) MONITORING AND ANALYZING THE STORAGE QUALITY AND THE DRIVE HARDWARE PERFORMANCE OF A MEDIA LIBRARY

(75) Inventors: Nils Haustein, Soergenloch (DE); Stefan Neff, Bingen (DE); Ulf Troppens, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 12/194,200

(22) Filed: Aug. 19, 2008

(65) Prior Publication Data

US 2009/0059757 A1  Mar. 5, 2009

(30) Foreign Application Priority Data

Aug. 27, 2007 (EP) .................................. 07115007

(51) Int. Cl.
G11B 20/18 (2006.01)
(52) U.S. Cl. ...................... 369/53.42; 53/53.1; 53/53.12
(58) Field of Classification Search ............... 369/44.29, 369/53.44, 43, 47.1, 53.42; 360/31; 714/38; 711/159, 154; 703/23
See application file for complete search history.

(56) References Cited

U.S. PATENT DOCUMENTS

| 6,977,873 | B2 * | 12/2005 | Turner et al. ............... 369/44.29 |
| 7,254,525 | B2 * | 8/2007 | Briggs et al. .................... 703/23 |
| 2002/0131346 | A1 * | 9/2002 | Turner et al. ............... 369/44.29 |
| 2003/0128448 | A1 * | 7/2003 | Gunderson et al. ............. 360/31 |
| 2005/0044451 | A1 * | 2/2005 | Fry et al. ......................... 714/38 |
| 2006/0215509 | A1 * | 9/2006 | Yun et al. ..................... 369/47.1 |
| 2007/0050569 | A1 * | 3/2007 | Haustein et al. ............. 711/154 |
| 2008/0263294 | A1 * | 10/2008 | Kishi et al. ................... 711/159 |
| 2009/0180369 | A1 * | 7/2009 | Kimmelmann et al. ... 369/53.44 |

* cited by examiner

*Primary Examiner* — Thuy N Pardo
(74) *Attorney, Agent, or Firm* — James R. Nock

(57) ABSTRACT

A method and infrastructure are provided for monitoring and analyzing the storage media quality and the drive hardware performance of a media library. The media library comprises a plurality of removable storage media, a plurality of drive units for said storage media and means for moving said storage media to and from appropriate drive units. The media library is managed by a management system being connected to said media library. At least one reference medium of a known and proven quality to compare the performance of at least one of said storage media in a given drive unit with the performance of said reference medium in said given drive unit and/or to test the performance of at least one given drive unit of said media library when acting on said reference medium.

8 Claims, 4 Drawing Sheets

MONITORING AND ANALYZING THE STORAGE QUALITY AND THE DRIVE HARDWARE PERFORMANCE OF A MEDIA LIBRARY

BACKGROUND OF THE INVENTION

1. Field of the invention

In general, the present invention relates to the monitoring and analyzing of media quality and drive hardware performance of a media library comprising a plurality of removable storage media, a plurality of drive units for said storage media and means for moving said storage media to and from appropriate drive units, wherein said media library is managed by a management system being connected to said media library.

2. Description of the Related Art

Tape drive technology comprising a Statistical Analysis and Reporting System (SARS) is well known in the prior art. Examples of such include International Business Machines' IBM Total Storage™ 3590 tape drive, IBM LTO and IBM Total Storage™ 3592 tape drive. SARS is part of the tape drive firmware and provides Media and Hardware algorithms for monitoring and analyzing media and hardware failures during every load, data transfer and unload cycle. Thereby, statistical and error information is recorded for every tape operation and serves as historical information for drive hardware and media analysis. SARS analyzes tape drive and tape cartridge performance as well, to determine:

1) Whether the tape cartridge or the hardware in the tape drive is causing unreported errors.

2) If the tape media is degrading over time.

3) If the tape drive hardware is degrading over time.

As a result of this analysis SARS provides messages according to the SCSI standard such as media information messages (MIM), system information messages (SIM) or tape alerts. The historical information and analysis results are stored in a non-volatile memory within the drive and in parallel in the tape cartridge memory chip (LTO, 3592) using a non-contact, low-level radio frequency (RF) field, generated by the drive. Alternatively, this information is stored in a VCR (Volume Control Region) for IBM 3590 technology. If a tape drive performs poorly with different tape volumes, a self-diagnostic test is performed and service repair messages or error codes are presented via the operator panel, StorWatch, SNMP and/or call home functions. Similarly, if individual tape volumes show poor performance on different drives, 'read-only' or 'discard-media' messages are presented. So SARS is already a good base to analyze hardware and media errors and determine trends.

In some cases it is difficult for the SARS algorithm to differentiate between media and drive hardware errors. This is because SARS runs usually separately on every tape drive and therefore a given tape drive's SARS algorithm has no notion how a particular media performs in other drives or how other drives perform. But this information might be needed in order to differentiate between drive hardware and media errors. This lack causes higher replacement rates, higher service cost and customer dissatisfaction.

Some examples for errors which might not be clearly differentiated and related to either the media or the drive hardware are:

a) Damaged edges on media—where the edge of the media is wrinkled for example. In these cases the SARS method cannot clearly identify the failure because it does not know whether the read-write heads near the edge are performing bad or whether the edge of the tape is damaged.

b) Vertical or horizontal scratches on the media c) Detection of media folds d) Coating issues of the media which can vary from different media vendors production technology e) Certain scenarios of head defects where the SARS method might not be able to differentiate between media or R/W head related errors, especially if the R/W head performance is marginal f) "bearing flutter" of tape path rollers (quality issue) which downgrades performance and number of (backward) datasets written on a tape.

These errors could be clearly differentiated if a media of a known quality is used for error isolation and compared against the performance of the media or drive in question.

In summary, SARS automatically analyzes the performance and error statistic for a given tape drive and storage medium. SARS has some limitations when it comes to errors which cannot be clearly identified as either media errors or drive hardware errors. This limitation is mainly because SARS does not compare a "good" media to a "bad" media or a "good" R/W head to a "bad" R/W head.

There is a need to enhance the prior art techniques of monitoring and analysing the media quality and drive hardware performance of a media library.

SUMMARY OF THE INVENTION

The present invention provides a method and infrastructure for monitoring and analyzing the storage quality and the drive hardware performance on a media library. This is characterized by using at least one reference medium of a known and proven quality to compare the performance of at least one of said storage media in a given drive unit with the performance of said reference medium in said given drive unit and/or to test the performance of at least one given drive unit of said media library when acting on said reference medium.

To that effect, the claimed infrastructure—comprising a media library with a plurality of removable storage media, a plurality of drive units for said storage media and means for moving said storage media to and from appropriate drive units; further comprising a media management system for said media library, said media management system being connected to said media library; and first repository means for storing statistical and error information about said removable storage media and drive units of said media library—is characterized by at least one reference medium of a known and proven quality; a reference media system for managing said reference media, wherein said reference media system is connected to said media management system and to said media library; and second repository means for storing statistical and error information about said reference media.

This invention is not only applicable to tape libraries but libraries of removable media in general—systems where an I/O device loads and unloads different media. Other types of removable media are optical media such as DVD, Blue-Ray and disk based systems such as Cheetah.

According to the present invention the reference media are used for the purpose of comparison. Thus, the method according to the invention can use well approved test procedures applying them once to a given drive unit with a given storage medium and once to said drive unit with an appropriate reference medium to compare the results.

This is especially advantageous in the context of statistical analysis and reporting systems, where each of said storage and reference media and each of said drive units provide statistical and error information for each operation performed on one of said storage and reference media, and wherein the quality of a given storage medium and the performance of a given drive unit are determined on the base of said statistical and error information. Usually, said error information is analyzed to classify the corresponding error and to identify said error either as drive hardware error or as media error or as none of them, if possible. It has turned out that at least the following statistical and error information is useful for monitoring and analysing the quality of storage media so that it should be stored for each storage and reference media:
number of mounts,
total number of data read and written,
list of drive units associated with the last x mounts,
number and class of errors.

Correspondingly, it is useful to store at least the following statistical and error information for each drive unit:
number of mounts,
total number of data read and written,
list of media associated with the last x mounts,
number and class of errors.

There are various possibilities for using reference media in evaluating the quality and performance of storage media and drive hardware as proposed by the invention.

In a first embodiment of the present invention the reference media are used for proactive monitoring and verification of drive hardware and storage media. Therefore, the statistical and error information is continuously collected for each storage medium and each drive unit of the media library. Besides, a threshold is defined for each class of error. Then, whenever the threshold for a class of error has been crossed by a given drive unit, the performance of said drive unit is tested by acting on an appropriate reference medium. In addition or alternatively, whenever the threshold for a class of error has been crossed by a given storage medium, the quality of said storage medium is tested by processing an appropriate reference medium and comparing it to said storage medium in the same drive unit.

In another embodiment of the present invention, the reference media are used for error isolation which means to clearly identify an error either as drive hardware error or as media error or as none of them. Therefore, the performance of a selected storage medium in a given drive unit is compared with the performance of an appropriate reference medium in said given drive unit. Then, the performance of a selected drive unit is compared with the performance of a given drive unit of said media library when acting on said reference medium. Thus, building on SARS and other prior art techniques the reference media system introduced by the present invention provides methods to clearly isolate media and hardware failure in cases where SARS cannot make this clear decision. In addition, the error isolation process according to the present invention may provide corrective actions, when having identified an error either as drive hardware error or as media error.

When the error isolation process executes test procedures specific to the error information provided to meet the concerns of the corresponding error class, it is especially effective. The error isolation process might be invoked automatically whenever clear error isolation is required. In an alternate embodiment, this process may run periodically in the background. In yet another embodiment, an error isolation process might be invoked by the user.

The method according to the invention allows to determine the quality of a given storage medium and the performance of a given drive unit with a defined validation degree depending on the number of operations performed on the reference medium used. Therewith, it is possible to balance the correctness of the test and the duration of the test.

Using reference media according to the invention implies the necessity of managing these reference media. Consequently, appropriate methods are proposed with the present invention.

Firstly in this context a method is provided which offers the possibility to create a new reference medium by
selecting a drive unit with the least number of errors or where the number of errors of said drive is below a predefined threshold,
providing a storage medium of a specific media type and mounting said storage medium to an appropriate selected drive unit,
writing data patterns to said storage medium, reading and verifying these data patterns;
retrieving statistical and error information for each operation performed on said storage medium; and
analysing said statistical and error information to decide whether to make said storage medium a reference medium or not.

This creation of a reference medium may be initiated by a user and/or automatically as soon as the number of available reference media of a specific media type goes below a given threshold.

Furthermore a method for validation and, consequently, disposal of a reference medium is provided, comprising
mounting said reference medium to an appropriate selected drive unit,
writing data patterns to said reference medium, reading and verifying these data patterns;
retrieving statistical and error information for each operation performed on said reference medium during validation; and
analysing said statistical and error information to decide whether to keep said reference medium or to dispose it.

Validation of a given reference medium may be performed periodically and/or automatically as soon as the number of operations performed on said reference medium exceeds a given threshold and/or whenever said reference medium generates an error.

As well as for creation as for validation of a reference medium the drive unit with the least errors relative to the amount of data processed should be selected to achieve reference media with the most reliable quality.

Advantageously, the methods for creation and validation of reference media proposed by the invention allow a user to configure the validation degree of a reference medium. The validation degree allows a user to balance the time for processes such as creation, validation and error isolation with the quality of such processes. Thus, the validation degree specifies the amount of data written or processed on the reference medium which is directly proportional for the time duration of such processes and indirectly proportional to the quality of such process. For evaluation of the reference media and for testing the statistical and error information retrieved during creation and validation of a reference medium should be stored for each reference medium within the reference media system.

BRIEF DESCRIPTION OF THE DRAWINGS

The novel features of the invention are set forth in the appended claims. The invention itself, however, as well as modes of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
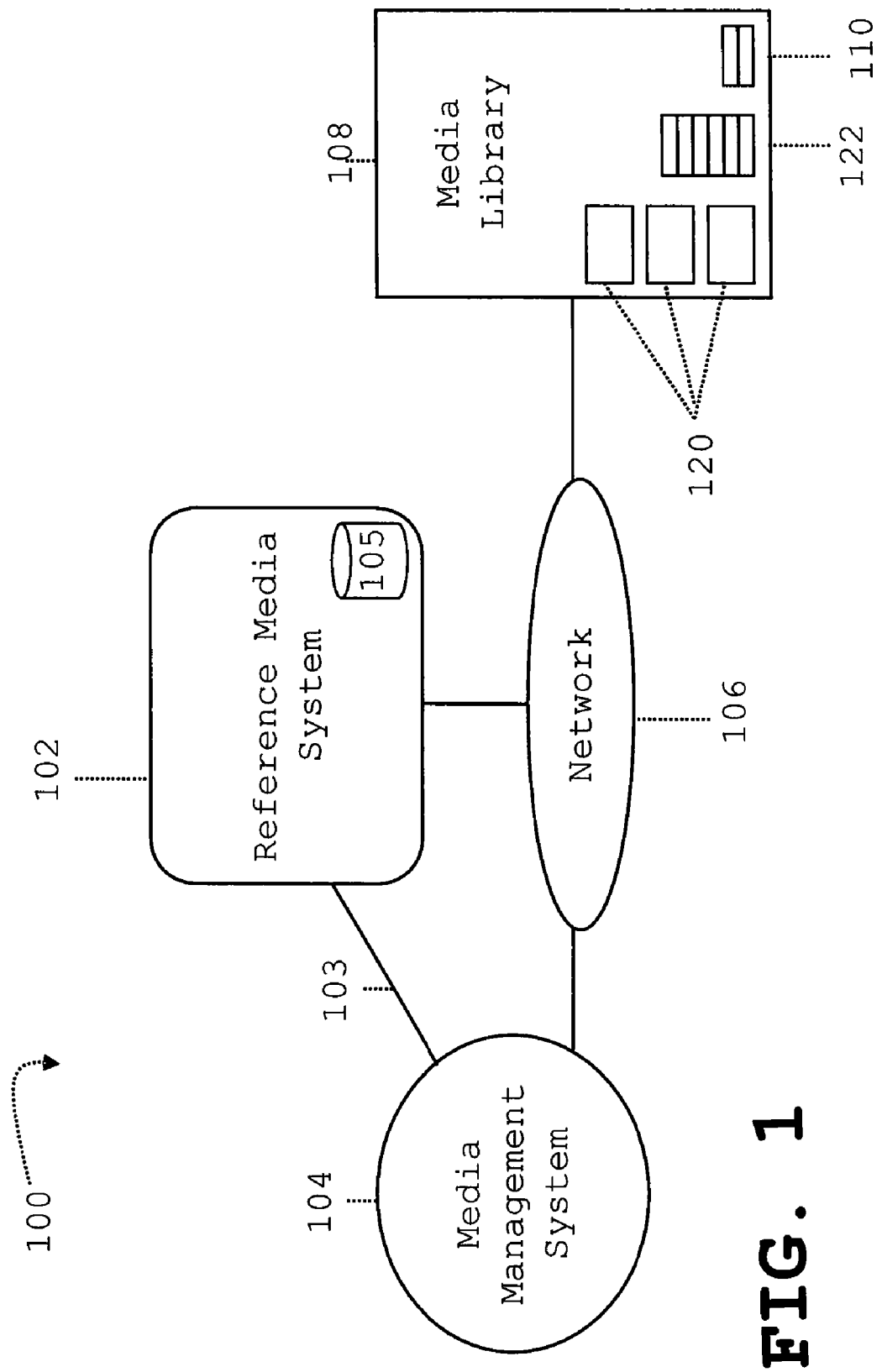
FIG. 1 shows a diagram illustrating the structure of a media library system supplemented by a reference media system and the cooperation of its components.

FIG. 1 presents the general structure of a media library system 100 comprising a reference media system 102 according to the present invention. The core of the media library system 100 is a media library 108 comprising a plurality of removable storage media 122, such as tapes residing in slots. The media library 108 further comprises a plurality of drive units 120 configured according to the media types and means for moving the removable media 122 from slots to drives 120 and from drives to slots. For example this can be a tape library such as International Business Machines Corporations' TS3500 or TS3310. As mentioned above, the present invention is not restricted to tape libraries but applies to any automated storage library, wherein the removable media 122 is used to store user data. Said removable media 122 is managed by a media management system 104, which is an application running on a computer system. For example this can be a backup or archive application such as Tivoli® Storage Manager reading and writing data on storage media 122 using drives 120 disposed in a removable media library. It can also be a library and media management application such as IBM Integrated Removable Media Manager for the Enterprise (IBM IRMM). In the here described example, the media management system 104 is connected to the media library 108 via a network 106. This network 106 can be based on Fibre Channel, Ethernet, INFINIBAND, or any other physical layer. The protocol can be based on SCSI, TCPIP, iSCSI, or any other protocol.

According to the invention, the media library system 100 comprises reference media 110 of a known and proven quality, which are here located in the media library 108. Said reference media 110 is managed by a reference media system 102, which is connected to the media management system 104 via a link 103. Link 103 can be based on Fibre Channel, Ethernet, INFINIBAND or any other physical layer. The protocol can be based on SCSI, TCPIP, iSCSI, or any other protocol. In another embodiment the link 103 may be realized through network 106. The reference media system 102 is also connected to the network 106 allowing access to the media library 108. This link is used to obtain statistical and error information about reference media 110, removable storage media 122 and drive units 120 and to initiate tests for differentiation between drive and media errors. This statistical and error information is stored in a repository 105 being part of the reference media system 102 in the here described example. Said repository 105 might be realized as database.

According to one aspect of the present invention, the reference media system 102 creates, validates and disposes reference media 110 in order to provide reference storage media with a known and proven quality. This is described in detail in connection with FIG. 2. Those reference media 110 are not used to store customer data but only for monitoring and analyzing the quality and performance of storage media and drive hardware of the media library 100 and especially to isolate media and drive hardware failures. Whenever there is a situation where it is not possible for the media management system 104 or the media library 108 comprising drives 120 to determine whether a medium 122 or a drive unit 120 is erroneous the reference media system 102 is used to make a clear decision. Therefore, the reference media system includes methods to run particular tests comparing the performance of reference media with the performance of other storage media and to compare the performance of drive units acting on said reference media.

As indicated above, the removable media 122 and drive units 120 provide statistical and error data for each operation performed on a removable medium, e.g. within SCSI LOG SENSE pages. Statistical data may include the amount of data processed, i.e. read and written, and number of mounts. The error data may include the number of temporary errors, i.e. correctable, and number of permanent errors, i.e. non-correctable errors. It may also include the location of the errors which might be denoted by a wrap, track and LPOS parameter. Statistical and error data provided by the removable media 122 and drive units 120 is retained as historical data about drives, media and reference media. This data is used by the methods to manage reference media, track media and drive statistics and differentiate between media and drive hardware errors. It might be stored by the reference media system 102 in its repository 105. In an alternate embodiment this data might be stored by the media management system 104. In yet another embodiment the inventive reference media system 102 is part of the removable media management system 104.

In the here described embodiment of the invention the reference media system repository 105 stores the following data for each storage medium 122 and reference medium 110 contained in the removable media library 108, wherein each medium 122 and 110 is clearly identified by a unique volume serial number:

number of mounts total number of data read and written list of drives associated with the last x mounts number and type of errors (read, write, temp, perm) and location (wrap, track, LPOS) and drives Besides, the reference media system repository 105 stores the following data for each drive unit 120 comprised in the removable media library 108, wherein each drive unit 120 is clearly identified by a unique serial number:

number of mounts total number of data read and written list of media associated with the last x mounts number and type of errors (read, write, temp, perm)

The data above is dynamically updated for each medium 122, drive unit 120 and reference medium 110 whenever processing for a given medium 122 or 110 in a given drive unit 120 is finished. This can be accomplished using SCSI commands inquiring LOG SENSE information.

Creation and validation of reference media as well as the processes for analyzing and monitoring the quality of storage media and drive hardware are timely dependent on the amount of data being processed during the tests using said reference media. The validation degree denotes the portion of a reference medium being used for analyzing and monitoring or error isolation. The portion used is directly proportional to the duration of these processes. For example if a reference medium has a capacity of 400 GB and a full (100%) validation is done, then it may take 4 hours. If the validation is only done for 20% of the medium, then the required time is shortened by a factor 5. Therefore the amount of data being processed is configurable and subsequently called validation degree. For example 20% of a reference medium can be created, validated and used for error isolation which speeds up the process but may not be as pristine as 100% of the medium, or a validation degree of 100%.

As it is possible to create and validate multiple reference media classes at distinct validation degrees for one and the same media type and to use them for quality tests concerning storage media and drive hardware of the media library, classification of the reference media considers the following parameters:

Media type (e.g. LTO-3 or 3592)
Validation degree
Class of error the reference medium is used for The media type includes all types of media used in a removable media library.

Figure 2:
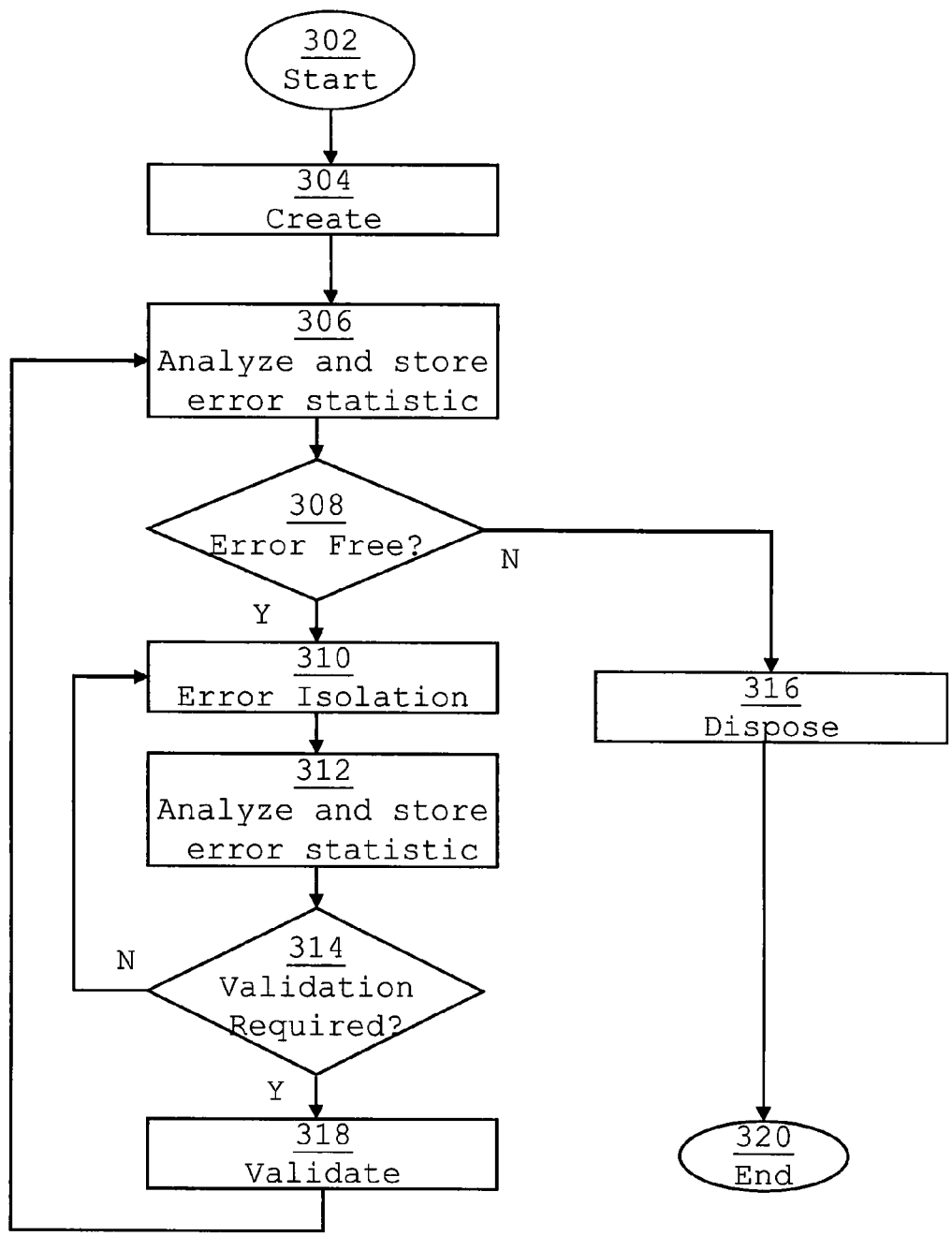
FIG. 2 shows a flowchart illustrating the reference media management according to the invention.

To manage the life cycle of reference media 110 methods are performed to create, validate and dispose reference media 110. Therefore, statistical and error information is tracked for each reference medium 110 over its entire life cycle. The life cycle process for a given reference medium 110 is managed by reference media system 102 and is illustrated in FIG. 2.

The life cycle of a reference medium starts in step 302 where a reference medium of a specific media type is provided. It might be a special reference medium provided by the manufacturer as part of a service offering. In step 304 the reference medium is created by writing, reading and verifying a certain amount of data in accordance to the validation degree to be achieved. In course of the creation process 304 statistical and error data about the reference medium processing is collected. In the next step 306 the statistical and error data of the creation process 304 is analyzed and stored in an appropriate repository, here repository 105. In step 308 it is determined whether the creation process 304 was error free for said reference medium.

If the answer is no, the life cycle process flows to step 316 where said reference medium is disposed. Then, the life cycle process for this reference medium ends in step 320.

If the answer in step 308 is yes, the life cycle process flows to step 310 where the just created reference medium is used for error isolation, which is explained later. During this step 310 statistical and error data concerning the reference medium is collected. Then, the life cycle process flows to step 312 where the statistical and error data of the error isolation process is analyzed and stored in the repository 105, too. In the next step 314 the decision is made whether the reference medium must be validated. This decision is derived from the analysis done in step 312 and is based on the error data for that reference medium. If the decision in step 314 is no, then the process returns to step 310 immediately allowing the reference medium to be used for further error isolation processes.

If the decision in step 314 is yes, then the process flows to step 318 where a validation of the reference medium is performed. The purpose of this validation is to determine whether a given reference medium still has a known good quality. In course of the validation in step 318 statistical and error data about the reference medium processing is collected.

From step 318 the process returns to step 306 where the statistical and error data for the reference medium is analyzed and stored in the repository 105. Subsequently, the process continues to step 308, as explained above. The life cycle for a reference medium ends when in step 308 the decision is made that it is not error free.

The three life cycle phases of a reference medium—creation 304, validation 318 and disposal 316—are further explained below.

During creation of a reference medium the system selects a storage medium and performs tests to verify the quality of this storage medium. The storage medium selected might be a special medium at highest quality provided by the manufacturer. During creation the selected medium is written with data patterns, read and verified. The amount of data being written and read during creation is configurable and depends on the validation degree to be achieved. If the read and write operations are performed without errors the reference medium has been successfully created. The selection of the tape drive for creation of the reference medium is based on the statistical data concerning the drive units of the media library, which is also stored in the repository 105. Reasonably, the drive unit with the least errors relative to the amount of processed data is selected. The creation of a reference medium of a certain media type might be triggered by a user. Alternatively, it may be invoked when the number of available reference media according to a certain type crosses a given threshold.

In the here described embodiment creation of a reference medium comprises the following steps:

Select most appropriate drive unit based on error statistics
Mount potential reference medium into said drive unit
Perform write and read operations in accordance to a given validation degree and error class
Retrieve statistical data (log sense, drive dump) thereby
Compare the obtained error statistics against threshold (no temporary error)
Decide
  to make this a reference medium or not, or
  to select another drive unit for creation
store statistical and error information of the reference medium created and update repository 105 respectively.

This method allows a user to create multiple reference media according to different reference media classes. For example for the media type LTO-3 three reference media at validation degree 20%, 50% and 100% might be created. Reference media created by this method are not used for customer data and are solely managed by the reference media system 102.

The validation of reference media is required because the quality of a reference medium may decline. Therefore it is important to validate the reference media by reading and writing data patterns to the reference medium. The amount of data being written and read during validation is configurable in accordance to the validation degree. The validation of a reference medium may be performed on a regular basis or it may be performed when a reference medium has been used a given number of times. In yet another embodiment validation may be done whenever the reference medium has been used for error isolation or whenever it has generated an error during error isolation. As for creation it is also reasonable for validation to use that drive unit of the media library which has the best error statistic.

In the here described embodiment validation of a given reference medium comprises the following steps:

Select most appropriate drive unit based on error statistics
Mount reference medium to be validated into said drive unit
Perform write and read operations in accordance to the validation degree and error class
Retrieve statistical data (log sense, drive dump) thereby
Compare the error statistics against a given threshold (no temporary error)
Decide
  to keep this as reference medium or not or
  to select another drive unit for validation
Update repository 105 with statistical and error information accordingly.

The disposal of a reference medium will occur when the reference media system 102 determines that the reference medium is not longer of good quality. The process of disposing a reference medium includes disabling access to said medium and exporting it from the removable media library 108 and, therefore comprises the following steps in the here described embodiment:

Set reference medium to status unavailable

Export reference medium

Post a message to the user or media management system 104 indicating the reference medium has been removed Update repository 105 and delete entries for reference medium If the number of reference media is lower than a given threshold start the method to create a reference medium.

The present invention provides a method for monitoring and analysing the storage media quality and the drive hardware performance of a media library, as it has been described above. This method is characterized by using at least one reference medium of a known and proven quality to compare the performance of at least one of said storage media in a given drive unit with the performance of said reference medium in said given drive unit and/or to test the performance of at least one given drive unit of said media library when acting on said reference medium.

According to the invention there are various possibilities to carry out these features.

One advantageous possibility consists in proactive monitoring and verification of drive hardware and storage media. Therefore, the reference media system 102 includes methods to continuously compare statistical and error information collected for storage media 122 and drive units 120 against given thresholds. There are thresholds for each class of error, such as servo errors, temporary read errors, temporary write errors etc. Thus, it is possible for example, to compare the temporary errors produced by a drive unit 120 with a threshold indicating the need for testing. If this threshold is crossed said drive unit has to be tested using an appropriate reference medium. If after that test the number of temporary errors still crosses the threshold said drive unit is flagged for maintenance. The novelty of this process is that a reference medium of a known and validated quality is used to validate the quality of a drive unit. The monitoring of storage media 122 is performed similarly. If a threshold is crossed this storage medium is compared to a reference medium with a known quality in one and the same drive unit. This allows to determine differences in the quality and performance of a known medium; i.e., a reference medium 110, and an unknown storage medium 122 and to make clear decisions. Thus, the quality of previously unknown media can be assessed using reference media.

Another advantageous possibility of using reference media according to the present invention is the error isolation process. This is applied to clearly isolate hardware from media errors based on the error symptom, when the media management system 104 or the media library 108 determines an error symptom which does not allow a precise decision between hardware and media error. The error isolation process may be invoked automatically by the media management system or by the removable media library based on automated notification such as SNMP traps or tape alerts or SIM/MIM messages, whenever clear error isolation is required. Error isolation process may also be triggered by the user or it may be scheduled periodically in the background. It may also be invoked when a storage medium 122 becomes degraded. This can be determined based on the statistical information stored in repository 105 of reference media system 102. Therewith, the reference media system 102 continuously monitors the performance of storage media 122 and drive units 120 and is able to determine trends and errors triggering an error isolation process.

The error isolation process executes test cases specific to the error class of the failure. The tests are executed in accordance to a test specification including the reference media class to be used for testing and a specification of a reference drive unit, as indicated in Table I. In addition the test cases are associated with a validation degree which is used to balance the correctness of the test and the test duration.

Error classes can for example be derived from tape alerts, SIM, MIM, SCSI sense information and other error messages produced by a drive unit 120 according to prior art. For example SCSI Sense information defines a sense key which classifies the error as media error or drive hardware error. The sense key is associated with an ASC/ASCQ which can be used to further classify the error. The error class might be determined by the media management system 104, removable media library 108 or reference media system. In the here described example the following error classes are defined:

Servo Error: The drive was unable to follow the positioning signal of the servo. The problem can be related to the drive servo read element or the medium servo track.

Read Error: The drive was unable to read data. The problem can be related to the drive read/write head or the medium.

Write Error: The drive was unable to write data. The problem can be related to the drive read/write head or the medium.

Default Error: The drive detected an error which cannot be assigned to the classes above. The problem can be related to drive or medium.

In practice, more error classes can be defined. Thus, the present invention is not limited to these error classes, even though these error classes represent the basic classes of errors.

A specific protocol is required for communication between the media management system 104 and the reference media system 102. This protocol can be based on TCPIP or on any other communication protocol of prior art. It includes basic commands between the two systems such as:

1. From media management system 104 to reference media system 102: "perform problem determination" for a given medium serial number and/or drive serial number according to an error class.

It should be mentioned here, that the error class can also be determined by the reference media system 102 based on the statistical data stored for each medium 122 in the removable media library 108.

2. From reference media system 102 to media management system 104: "result of the problem determination and corrective actions" including whether the medium or the drive or none is degraded and corrective actions.

Upon reception of the "perform problem determination" command the reference media system 102 uses table I to derive the appropriate parameters and steps for the testing procedures. Table I has the following structure according to the preferred embodiment of this invention:

TABLE 1

Mapping of error class to reference media selection, drive selection policy and test procedure.

| (402) Error Class | (404) Reference Media Class | (406) Secondary drive class | (408) Test procedure |
|---|---|---|---|
| SERVO READ WRITE DEFAULT | SPECIAL_SERVO OR RM_100% | Least Servo Errors | See process 500 (FIG. 5) |

The following steps are performed by the reference media system 102 using table I:
1. Select the appropriate reference media class 404 to be used based on the error class 402 and validation degree.
2. Determine the appropriate test procedure 408 to be used based on the error class 402. The test procedures respect the validation degree.
3. Select the appropriate secondary test drive 406 based on the error class. This specifies the drive to be used for testing based on an error statistic.
4. Perform problem determination test procedure 408
5. Analyze the results of the problem determination tests
6. Derives and executes corrective actions and post the "results of the problem determination and corrective actions" to the media management system.

Since the reference media system 102 is not directly in the data path between media management system 104 and media library 108 the corrective actions provided by the reference media system 102 are focused on recommendations given to the media management system 104 as part of the message "result of the problem determination and corrective actions".

For example, the second row of table I is interpreted by the reference media system according to this invention in the following way. If the media management system sends a "perform problem determination" command with associated error class information 402 of SERVO (indicating a track following or servo error on subject medium) and an associated medium serial number and drive serial number, the reference media system derives the reference medium class (column 404). In this case it can either be a special servo reference media provided by the manufacturer (SPECIAL_SERVO) and if this is not available it can be reference medium which has been validated 100%. In the next step the reference media system derives the secondary drive (column 406) used for testing. According to the policy in this field the secondary drive must be one with the least servo errors. In the next step the reference media system performs the test case (column 408) and derives and executes corrective actions. In the exemplary case a servo error problem has been discovered and the test should isolate the drive hardware or the media.

Figure 3A:
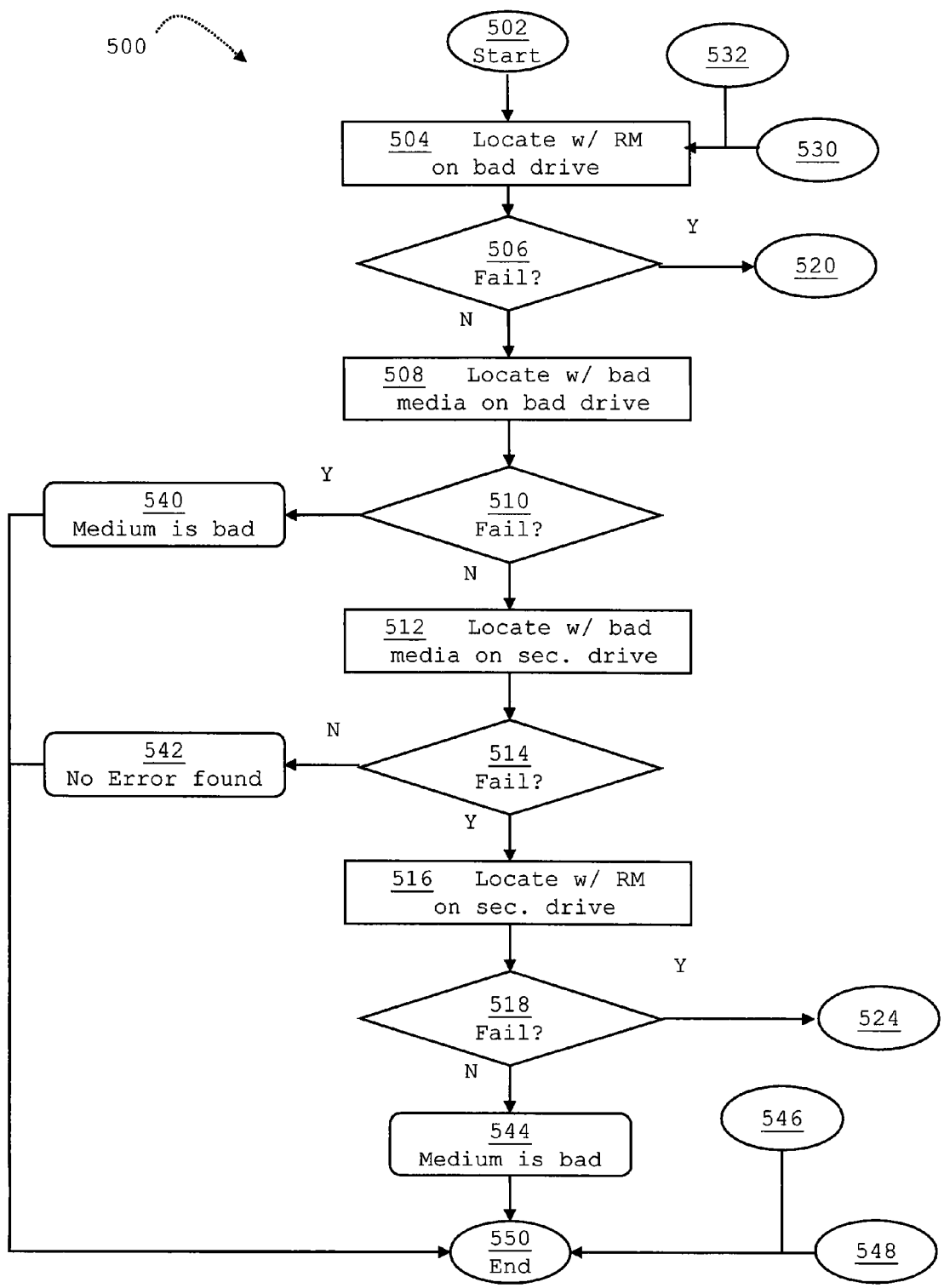
FIG. 3a/b show a flowchart illustrating a process for isolation of Servo errors and related corrective actions.

The associated test process 500 including corrective actions is presented in FIGS. 3a and b. According to FIG. 3a process 500 starts at step 502 which is the entry point for the reference media system and continues to step 504 where the reference medium is loaded in the bad drive—the drive indicated by the media management system 104. In step 504 a locate operation is performed which essentially utilizes the servo to locate each block written on the reference medium. If this operation in step 504 completes the result is verified in step 506.

If the operation in step 504 did not fail the process continues to step 508 where the bad medium—indicated by the media management system 104—is loaded in the bad drive and the locate operation is performed with the bad medium in the bad drive. If this operation in step 508 completes the result is verified in step 510.

If the result in step 510 indicates a failure (yes path) then the reference media system 102 indicates to the media management system 104 that the medium is bad in step 540 and instructs the media management system 104 to move all data off this medium and remove it from the library 108. The process flows from step 540 to ending step 550, explained later.

Otherwise if the result in step 510 indicates no failure then the process flows to step 512. In step 512 the bad medium is loaded in the secondary drive (column 406 of table I) and the locate operation is performed with the bad medium in the secondary drive. If this operation in step 512 completes the result is verified in step 514.

If the result in step 514 indicates no failure (no path) then the reference media system 102 indicates to the media management system 104 that no error has been found in step 542 and instructs the media management system 104 to do nothing. Then, process flows from step 542 to ending step 550.

Otherwise, if the result in step 514 indicates a failure (yes path) then the process flows to step 516. In step 516 the reference medium is loaded in the secondary drive (column 406 of table I) and the locate operation is performed with the reference medium in the secondary drive. If this operation in step 516 completes the result is verified in step 518.

If the result in step 518 indicates no failure (no path) then—in step 544—the reference media system 102 indicates to the media management system 104 that the medium is bad and instructs the media management system 104 to move all data off this medium and remove it from the library 108. The process flows from step 544 to ending step 550.

Otherwise, if the result in step 518 indicates a failure (yes path) then the process flows to step 524 to validate the reference medium what is explained later.

If the result in step 506 indicates a failure (yes path) then—in step 520 (see FIG. 3b)—the reference media system 102 loads the reference medium in the secondary drive (column 406 of table I) and the locate operation is performed with the reference medium in the secondary drive. If this operation in step 520 completes the result is verified in step 522.

If the result in step 522 indicates no failure (no path) then the reference media system 102 indicates to the media management system 104 that the drive is bad in step 546 and instructs the media management system 104 to set this drive offline. The process flows from step 546 to ending step 550.

Figure 3B:
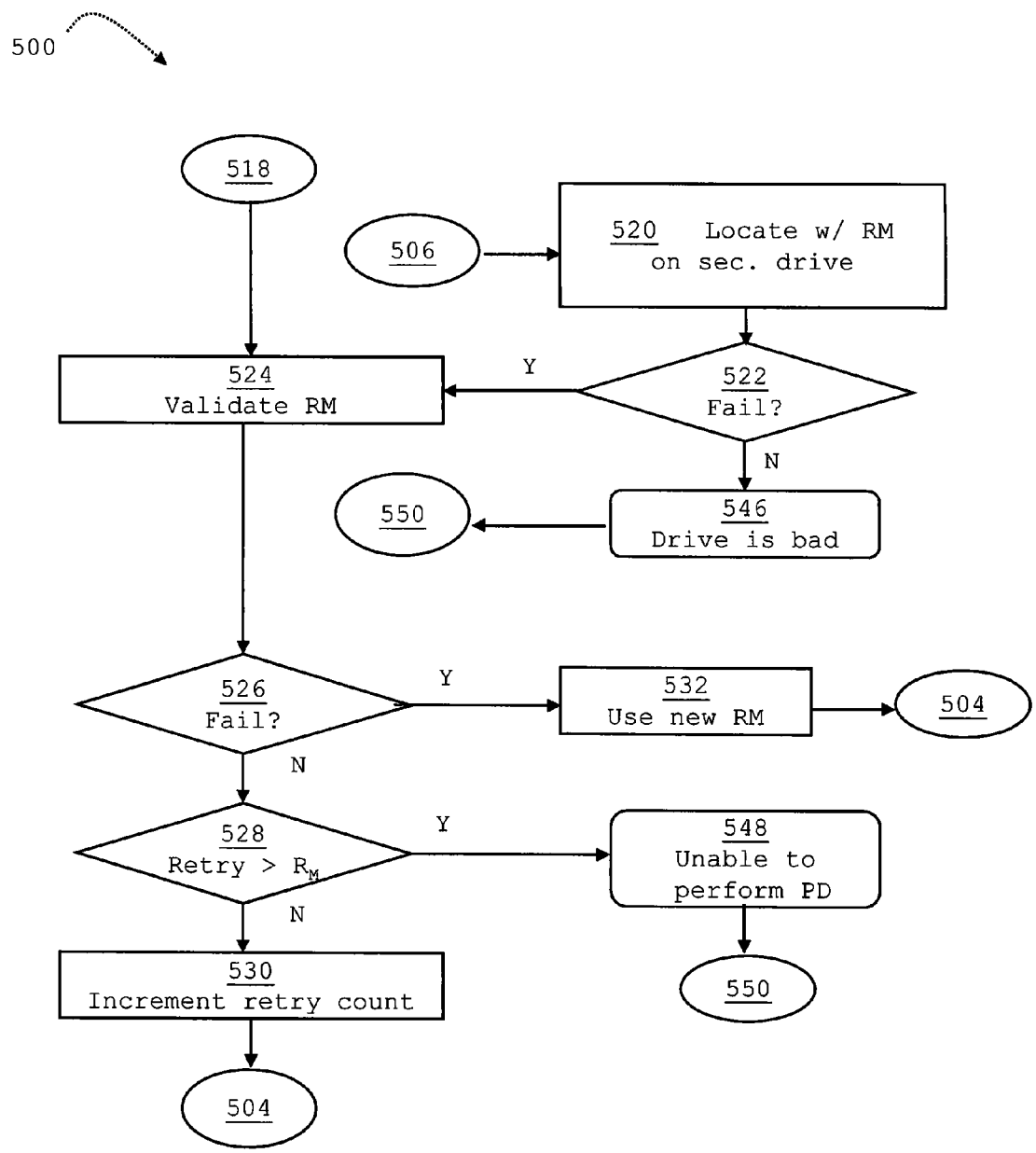

Otherwise, if the result in step 522 indicates a failure (yes path) then the process flows to step 524 (see FIG. 3b). In step 524 the reference medium must be validated, because it failed in the secondary drive. If the validation is complete then the result of the validation is checked in step 526.

If the result indicates that the validation of the reference medium failed in step 526 (yes path) then the process continues to step 532 where a new reference medium is selected and the process flows back to step 504 where the process begins with a new reference medium in order to perform process 500 again.

Otherwise, if the result in step 526 indicates that the validation was successful (no path) then the process continues to step 528 where a retry counter is checked against a maximum retry counter ($R_M$). Maximum retry counter $R_M$ might be set to a value of 3 and is the user configurable maximum retry counter.

If the number of retries is less than the maximum retry counter $R_M$ in step 528 the process flows to step 530, where the retry counter is incremented by 1 and the process flows back to step 504 where the test is being repeated.

Otherwise, if the number of retries is equal or greater than the maximum retry counter $R_M$ then the process flows to step 548.

In step 548 the reference media system 102 decides that it is unable to eliminate the error. It instructs the media management system 104 to call for professional service in order to determine the problem. From step 548 the process flows to the ending step 550.

In ending step 550 the reference media system 102 communicates the results of steps 540, 542, 544, 546 or 548 to the media management system 104 as the message "result of problem determination and corrective actions". Besides, in step 550 the retry counter is reset to 0. The process 500 ends.

The validation degree for a reference media is considered as part of the selection of the reference medium (step 1 in processing for table 1). The error isolation process—such as process 500—is performed in accordance to the validation degree. Thus, the error isolation process steps 504, 508, 512, 516, 520 and 524 are performed in accordance to the validation degree. The validation degree can be configured from the user for each reference media class (404 in table I) based on the error class (402 in table I). In an alternate embodiment the validation degree is selected by the reference media system as part of step 1 in processing for table 1 and depends on the utilization of the reference media system.

The test procedures 408 are user configurable and might be specified by subject matter expert. These test procedures can be delivered as part of a service offering as well as updates to it.

Table I can be extended to further describe the recovery procedure for error classes READ, WRITE and DEFAULT. The default error class is intended to be used for errors which cannot clearly be isolated to the other error classes.

Finally, the key aspects of the present invention are summed up by reference media of a known and proven quality and a corresponding reference media system to supplement a media library, as it is well-known in the art, so that the resulting media library system is able to a) create, validate and dispose reference media, b) proactive monitor media and hardware errors and c) isolate hardware and media errors based on error classes and validation degree and provide corrective actions.

The reference media system according to this invention can be realized as a service offering for customers using removable media. The business model for this service offering may include that the customer is charged whenever the error isolation process runs. The customer may also be charged by the amount of reference media used in the system and its validation degree.

This idea applies to any automated storage library, not just an automated tape storage library. For example, precisely the same algorithms would apply to (a) an optical library, where the "optical" storage is taken from the group of (i) magneto-optical, (ii) phase-change optical, (iii) Digital Versatile Disk or DVD, (iv) High-Definition DVD or HD-DVD, (v) Blu-Ray, (vi) Ultra-Density Optical or UDO, and (vii) holography. The same algorithms described in the disclosure would also apply to (b) a hard disk drive library, such as the CHEE-TAH HDD library or (c) a flash-memory library. Finally, the same algorithms would also apply to (d) an optical-tape library.

The invention claimed is:

1. A method for monitoring and analyzing the storage media quality and the drive hardware performance of a media library, the media library comprising: a plurality of removable storage media, a plurality of drive units for said storage media and means for moving said storage media to and from appropriate drive units; wherein said media library is managed by a management system being connected to said media library; said method comprising the steps of:
    using at least one reference medium of a known and proven quality to compare the performance of at least one of said storage media in a given drive unit with the performance of said reference medium in said given drive unit; and
    testing the performance of at least one given drive unit of said media library when acting on said reference medium,
wherein each of said storage and reference media and each of said drive units provide statistical and error information for each operation performed on one of said storage and reference media, and wherein the quality of a given storage medium and the performance of a given drive unit are determined on the basis of said statistical and error information, and wherein said error information is analyzed classify the corresponding error and to identify said error either as drive hardware error or as media error or as none of them, if possible, wherein the statistical and error information stored for each of said storage and reference media comprises:
    a number of mounts,
    a total number of data read and written,
    a list of drive units associated with the last x mounts, and
    a number and class of errors.

2. A method for monitoring and analyzing the storage media quality and the drive hardware performance of a media library, the media library comprising: a plurality of removable storage media, a plurality of drive units for said storage media and means for moving said storage media to and from appropriate drive units;
wherein said media library is managed by a management system being connected to said media library;
said method comprising the steps of:
    using at least one reference medium of a known and proven quality to compare the performance of at least one of said storage media in a given drive unit with the performance of said reference medium in said given drive unit; and
    testing the performance of at least one given drive unit of said media library when acting on said reference medium,
    wherein each of said storage and reference media and each of said drive units provide statistical and error information for each operation performed on one of said storage and reference media, and wherein the quality of a given storage medium and performance of a given drive unit are determined on the basis of said statistical and error information, and wherein said error information is analyzed to classify the corresponding error and to identify said error either as drive hardware error or as media error or as none of them, if possible, wherein the statistical and error information stored for each of said drive units comprises:
    a number of mounts,
    a total number of data read and written,
    a list of media associated with the last x mounts, and
    a number and class of errors.

3. A method for monitoring and analyzing the storage media quality and the drive hardware performance of a media library, the media library comprising: a plurality of removable storage media, a plurality of drive units for said storage media and means for moving said storage media to and from appropriate drive units;

wherein said media library is managed by a management system being connected to said media library;

said method comprising the steps:

using at least one reference medium of a known and proven quality to compare the performance of at least one of said storage media in a given drive unit with the performance of said reference medium in said given drive unit; and testing the performance of at least one given drive unit of said media library when acting on said reference medium, wherein each of said storage and reference media and each of said drive units provide statistical and error information for each operation performed on one of said storage and reference media, and wherein the quality of a given storage medium and the performance of a given drive unit are determined on the basis of said statistical and error information, and wherein said error information is analyzed to classify the corresponding error and to identify said error either as drive hardware error or as media error or as none of them, if possible, comprising at least one test procedure specific to the error information retrieved, especially specific to the corresponding class of error, wherein a reference medium is selected for said test procedure based on said error information, especially on the corresponding class of error.

4. A method for monitoring and analyzing the storage media quality and the drive hardware performance of a media library, the media library comprising: a plurality of removable storage media, a plurality of drive units for said storage media and means for moving said storage media to and from appropriate drive units;

wherein said media library is managed by a management system being connected to said media library;

said method comprising the steps of:

using at least one reference medium of a known and proven quality to compare the performance of at least one of said storage media in a given drive unit with the performance of said reference medium in said given drive unit; and testing the performance of at least one given drive unit of said media library when acting on said reference medium, wherein each of said storage and reference media and each of said drive units provide statistical and error information for each operation performed on one of said storage and reference media, and wherein the quality of a given storage medium and the performance of a given drive unit are determined on the basis of said statistical and error information, and wherein said error information is analyzed to classify the corresponding error and to identify said error either as drive hardware error or as media error or as none of them, if possible, wherein said statistical and error information is continuously collected for each of said storage media and each of said drive units;

wherein a threshold is defined for each class of error; and wherein, whenever the threshold for a class of error has been crossed by a given drive unit, the performance of said drive unit is tested by acting on an appropriate reference medium; and wherein, whenever the threshold for a class of error has been crossed by a given storage medium, the quality of said storage medium is tested by processing an appropriate reference medium in the same drive unit.

5. A method for monitoring and analyzing the storage media quality and the drive hardware performance of a media library, the media library comprising: a plurality of removable storage media, a plurality of drive units for said storage media and means for moving said storage media to and from appropriate drive units;

wherein said media library is managed by a management system being connected to said media library;

said method comprising the steps of:

using at least one reference medium of a known and proven quality to compare the performance of at least one of said storage media in a given drive unit with the performance of said reference medium in said given drive unit; and testing the performance of at least one given drive-unit of said media library when acting on said reference medium, wherein each of said storage and reference media and each of said drive units provide statistical and error information for each operation performed on one of said storage and reference media, and wherein the quality of a given storage medium and the performance of a given drive unit are determined on the basis of said statistical and error information, and wherein said error information is analyzed to classify the corresponding error and to identify said error either as drive hardware error or as media error or as none of them, if possible, wherein, in case that said error information does not allow a clear identification of the corresponding error either as drive hardware error or as media error or as none of them, an error isolation process is initiated using an appropriate reference medium to compare the performance of at least one of said storage media in a given drive unit with the performance of said reference medium in said given drive unit and/or to compare the performance of a selected drive unit with the performance of a given drive unit of said media library when acting on said reference medium.

6. The method according to claim 5, wherein corrective actions are provided, when having identified an error either as drive hardware error or as media error.

7. The method according to claim 5, wherein said error isolation process executes test procedures specific to said error information, especially to the corresponding class of error.

8. The method according to claim 5, wherein said error isolation process is initiated automatically and/or triggered by a user and/or scheduled periodically and/or invoked when a storage medium becomes degraded.

* * * * *